United States Patent
Swanson (10) Patent No.: US 7,810,580 B2
(45) Date of Patent: Oct. 12, 2010

(54) SECTORED DISC FOR OPENER

(76) Inventor: Guy J. Swanson, 1507 W. Ardmore Dr., Spokane, WA (US) 99218

( * ) Notice: Subject to any disclaimer, the term of this patent is extended or adjusted under 35 U.S.C. 154(b) by 111 days.

(21) Appl. No.: 11/936,685

(22) Filed: Nov. 7, 2007

(65) Prior Publication Data

US 2009/0114407 A1    May 7, 2009

(51) Int. Cl.
*A01B 15/16* (2006.01)
(52) U.S. Cl. ...................... 172/604; 172/535
(58) Field of Classification Search .............. 172/527, 172/535, 536, 568, 604
See application file for complete search history.

(56) References Cited

U.S. PATENT DOCUMENTS

| | | | | |
|---|---|---|---|---|
| 291,127 A | * | 1/1884 | Austin | 172/384 |
| 544,837 A | * | 8/1895 | Archer et al. | 172/548 |
| 1,006,589 A | * | 10/1911 | Noonan et al. | 172/535 |
| 1,051,824 A | * | 1/1913 | Ridgway | 172/535 |
| 1,054,899 A | * | 3/1913 | Bingham | 172/535 |
| 2,271,354 A | * | 1/1942 | Strandlund | 172/556 |
| 2,603,049 A | * | 7/1952 | Mullin | 172/599 |
| 2,701,996 A | * | 2/1955 | Wiese | 172/535 |
| 3,101,122 A | * | 8/1963 | Robinson | 172/556 |
| 3,125,166 A | * | 3/1964 | Hines | 172/120 |
| 4,246,971 A | * | 1/1981 | Johnson | 172/535 |
| 4,256,184 A | * | 3/1981 | Squibb | 172/531 |
| 5,752,453 A | * | 5/1998 | Nikkel et al. | 111/121 |

* cited by examiner

*Primary Examiner*—Thomas B Will
*Assistant Examiner*—Joel F Mitchell
(74) *Attorney, Agent, or Firm*—Hovey Williams LLP (57) ABSTRACT

A sectored disc assembly, removable disc sector, and method of replacing a disc sector are disclosed for use with a soil opener that uses a disc assembly to open the soil prior to injection of a fertilizer or seed into the ground. The sectored disc assembly includes a rotatable hub and a plurality of disc sectors cooperatively forming a substantially continuous disc around the hub. Connectors, such as bolts, secure each of the disc sectors to the hub. The disc sector includes a body with radially inner and outer margins and side margins that are configured for continuous abutment with adjacent side margins of other disc sectors. The method of replacing a disc sector includes removing the connector securing the disc sector to the hub, moving the disc sector radially outwardly away from the hub, placing a replacement disc sector into contact with the hub, and inserting the connector.

25 Claims, 7 Drawing Sheets

FIG. 8

SECTORED DISC FOR OPENER

BACKGROUND OF THE INVENTION

1. Field of the Invention

The present invention relates generally to soil openers that use a disc assembly to open the soil prior to injection of a fertilizer or seed into the ground. More specifically, the present invention concerns a sectored disc assembly for use in such a soil opener, a removable disc sector of a sectored disc assembly, as well as a method of replacing a disc sector of a sectored disc assembly.

2. Discussion of the Prior Art

Those of ordinary skill in the art will appreciate that farmers often use no-till planting techniques to produce all types of agricultural crops. Such no-till techniques minimize the disturbance to the soil and leaves the stubble, or organic matter from the previous crop, standing in the field. This, in turn, reduces water runoff in the field, thereby greatly reducing erosion of the top soil.

Typically, no-till planting involves using a rotatable disc soil opener to cut a furrow in the soil as it is pulled across a field, creating a small disturbed soil zone. Fertilizer, seeds, or both, are then injected into this disturbed soil zone, after which the furrow is closed. The closing of the furrow can be accomplished by naturally allowing the disturbed soil to flow back into the furrow, or by following the rotatable disc soil opener with a closing wheel designed to push soil into the disturbed soil zone and close the furrow. Often, the opening of the furrow, formation of the seed bed, injection of fertilizer, seed, or both, and closing of the furrow are accomplished in a single pass with a soil opener that includes a rotatable disc, an injector foot, and a closing wheel.

Conventional rotatable discs used in soil openers have been formed, most typically out of carbon steel, as single, annular bodies for rotation about a spindle on the soil opener. While this unitary construction has been satisfactory in some respects, such solid discs are very heavy components that can be difficult to handle and are often expensive to produce. As the rotatable disc component of a soil opener directly contacts the soil as the implement moves through a field, the disc is subject to considerable stress and is exposed to damage. Damage to a rotatable disc, often the result of transport, inexperienced or poor operators, or hitting a railroad track or rocks in the soil, requires replacement of the entire disc. Such disc replacement is expensive and time consuming, as the entire heavy disc must be removed from the soil opener, typically involving tedious disassembly of the entire supporting frame, and only then can an entire new disc be installed.

The cost associated with whole disc replacement can be disproportional to the amount of damage to the disc, such as when a single portion of the edge of the disc is damaged from hitting a rock. Additionally, the replacement of the whole disc results in considerable down time of the implement, as heavy components must be elevated out of the soil to facilitate removal of the disc to be replaced and installation of a new disc. The time requirement associated with such replacement adds to the cost and inconvenience of the periodic and necessary change out of rotatable discs.

SUMMARY

The present invention provides a unique sectored disc assembly, removable disc sector, and method of replacing a disc sector for use with a soil opener that uses a disc assembly to open the soil prior to injection of a fertilizer or seed into the ground. The sectored disc includes multiple disc sectors that can be removed and replaced individually, requiring a fraction of the cost and time of whole disc replacement. The quick and simple change out of disc sectors also allows an operator to match the disc material to the soil type for improved performance of the soil opener.

According to one aspect of the present invention, a sectored disc assembly for use in a soil opener of an agricultural implement is provided, wherein the disc assembly serves as a blade to open the soil prior to injection of a fertilizer or seed into the ground. The sectored disc assembly includes a rotatable hub, wherein the hub presents a central rotational axis and a radial outer periphery. The sectored disc assembly also includes a plurality of disc sectors, wherein each disc sector is disposed around the periphery of the hub and extends radially outwardly therefrom. The disc sectors cooperatively form a substantially continuous disc disposed radially around and coaxial with the hub. The disc sectors cooperate with the hub to define a substantially continuous interface therebetween around the periphery of the hub. Each disc sector cooperates with the hub to present a tongue-and-groove connection along the interface, wherein one of the disc sector and hub includes a radially extending internal groove and the other of the disc sector and hub includes a radially extending tongue, with the tongue being snugly received in the groove to restrict axial movement of the disc sector relative to the hub.

Another aspect of the present invention concerns a disc sector that is removably and individually connectable to a rotatable hub of a sectored disc assembly serving as a blade of a soil opener to open the soil prior to injection of a fertilizer or seed into the ground, wherein the hub presents a central rotational axis and a pair of circumferentially extending opposed faces along the outer periphery thereof, and wherein the disc sector cooperates with other disc sectors to form a substantially continuous disc disposed radially around the hub. The disc sector includes a sector body that presents a radially inner margin, a radially outwardly spaced generally arcuate outer margin, and generally radially extending side margins each defined between the inner and outer margins. The body includes a pair of opposed engagement surfaces configured for flush contact with the opposed faces of the hub so that axial movement of the disc sector relative to the hub is thereby restricted. The body presents an axial thickness that tapers in a radially outer direction adjacent the outer margin. The side margins cooperatively form an acute angle therebetween and are configured for continuous abutment with adjacent ones of the other disc sectors.

Yet another aspect of the present invention concerns a method of replacing a disc sector of a sectored disc assembly serving as a blade of a soil opener to open the soil prior to injection of a fertilizer or seed into the ground. The method includes the steps of removing the connector that secures the disc sector to the rotatable hub of the sectored disc assembly, moving the disc sector radially outwardly and away from the hub, placing a replacement disc sector into contact with the hub so that the replacement disc sector and hub cooperatively form a tongue-and-groove connection extending along the periphery of the hub, and inserting the connector to secure the replacement disc sector to the hub.

This summary is provided to introduce a selection of concepts in a simplified form that are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Figure 1:
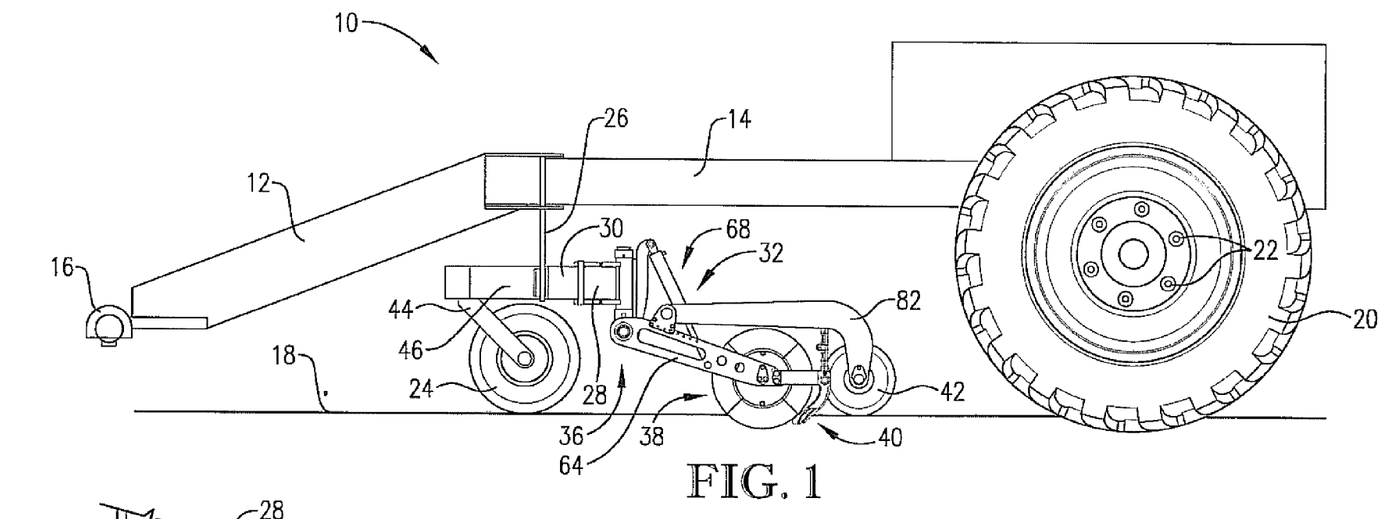
FIG. 1 is a side elevational view of a portion of a towable agricultural implement with a soil opener including a rotatable sectored disc assembly constructed in accordance with the principles of a preferred embodiment of the present invention.

With initial reference to FIG. 1, a towable agricultural implement 10 selected for purposes of illustration includes a floating hitch section 12 and a framework 14. The floating hitch section 12 includes a hitch connector 16 at a terminal end thereof. It will be appreciated by one of ordinary skill in the art that the hitch connector 16 is configured for coupling the implement 10 to a corresponding towing hitch on a driving power source (not shown) for pulling the implement 10 across a field. It is also noted that such a driving power source could take the form of a tractor, or any other suitable power source known in the art, without departing from the teachings of the present invention.

Figure 3:
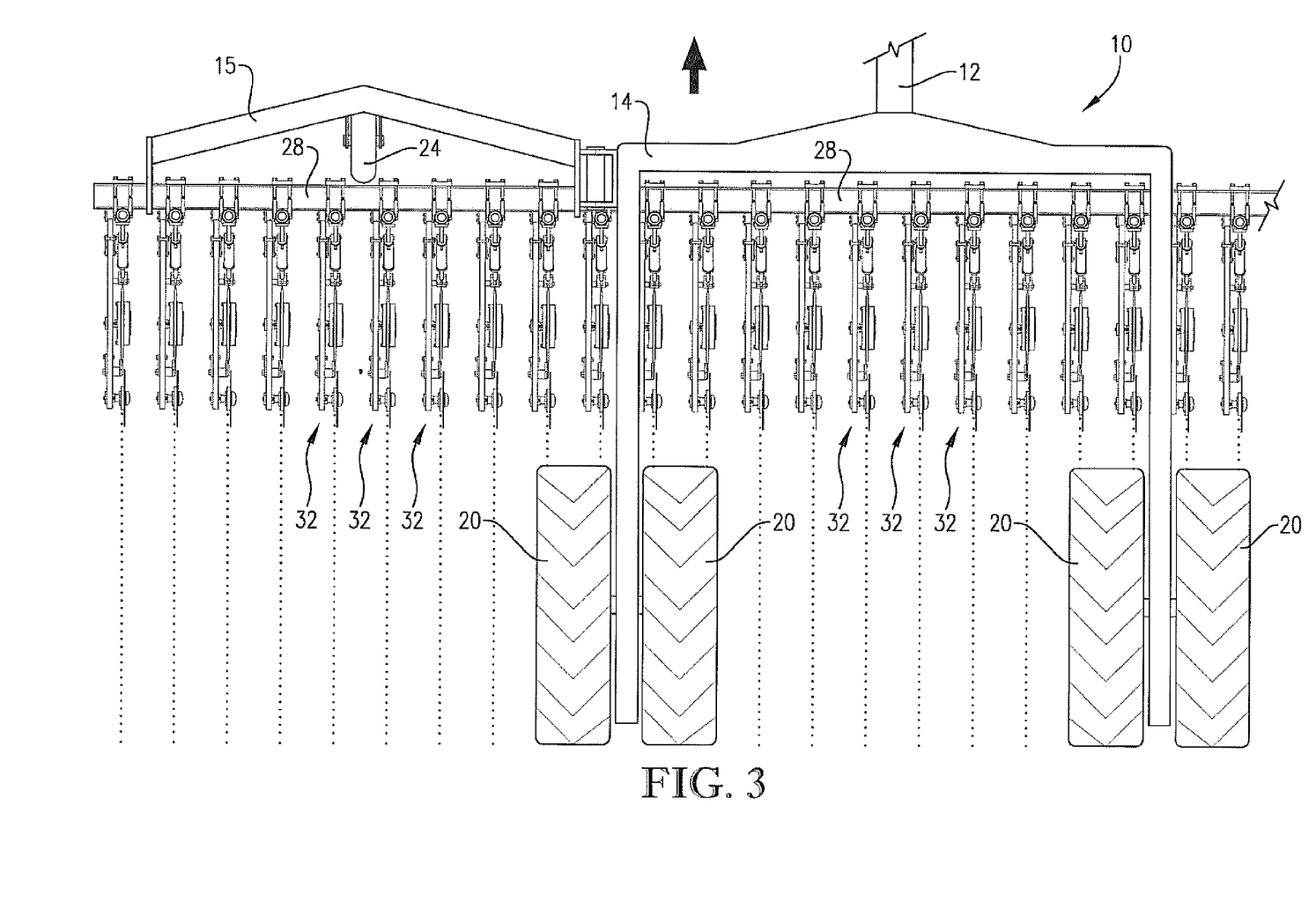
FIG. 3 is a fragmentary top-down plan view on a reduced scale of a towable agricultural implement having a toolbar and a plurality of soil openers including rotatable sectored disc assemblies constructed in accordance with the principles of a preferred embodiment of the present invention.

The framework 14 is supported above the ground 18 by wheels 20, rotatably connected to the framework 14 by bolts 22, in a manner known in the art and not shown in detail here. With reference to FIG. 3, the implement 10 is pulled through a field in the direction indicated by the large arrow. Thus, the wheels 20 support the rear portion of the framework 14. The front portion of the framework 14 is supported by the connection of the floating hitch section 12 to a driving power source and an additional section 15 of the framework 14 is supported in the front by a supplemental swiveling support wheel 24.

As shown in FIG. 1, the swiveling support wheel 24 is journaled to a wheel arm 44 for rotation therebetween. The wheel arm 44 is pivotally coupled to a forward extension 46 in a manner known in the art and not shown in detail here. The forward extension 46 brackets to the toolbar 28 to space the swiveling support wheel 24 ahead of the toolbar 28 as the implement 10 moves across a field. It is noted that the swiveling support wheel 24 is disposed on the section 15 of the framework 14 that is not otherwise supported in the front by the connection of the floating hitch section 12 to a driving power source. Additionally, this section 15 of the framework 14 may pivot upwards relative to the central section of the framework 15 to facilitate transport of the implement 10 across the ground other than in a field, as will be readily appreciated by one of ordinary skill in the art. It is noted, however, that such arrangement of the framework 14 is not critical to the principals of the present invention.

Returning now to FIG. 1, the framework 14 also includes a vertically extending support member 26, extending downwardly from the framework 14. The support member 26 connects the framework 14 to a toolbar 28, through a spacing element 30, in a manner known in the art. As shown particularly in FIG. 3, the toolbar 28 extends transverse to the direction of travel of the implement 10. A plurality of soil opener assemblies 32 are coupled to the toolbar 28, as described in more detail below.

It is noted that FIG. 3 depicts a plurality of soil opener assemblies 32 linearly coupled to the toolbar 28 in a single gang. However, it will be appreciated that the layout of the plurality of soil opener assemblies 32 could take other forms, such as a two gang configuration, or be variously configured in any manner known in the art, including any alternative suitable number or spacing of soil opener assemblies 32. It is further noted that each soil opener assembly 32 is virtually identically configured to each other soil opener assembly 32. Thus, in each of the drawing figures other than FIG. 3, only a single soil opener assembly 32 is depicted, with the understanding that other soil opener assemblies 32 are similarly constructed.

Figure 2:
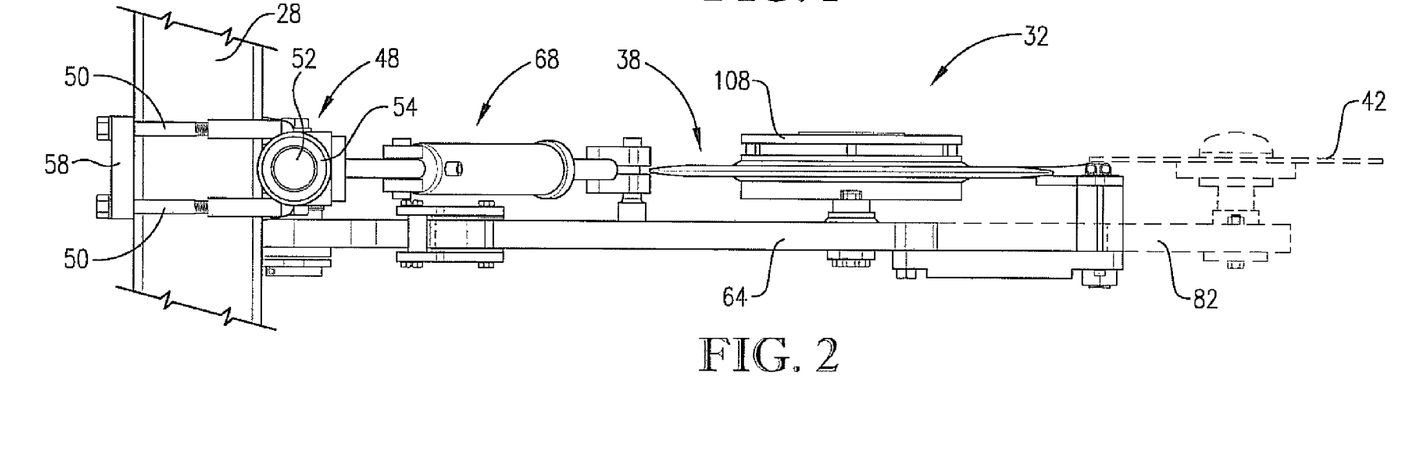
FIG. 2 is an enlarged, fragmentary top-down plan view of a portion of the soil opener shown in FIG. 1, with an optional closing wheel shown in phantom lines, particularly illustrating the coupling of the soil opener to the toolbar and the rotatable sectored disc assembly.
Figure 5:
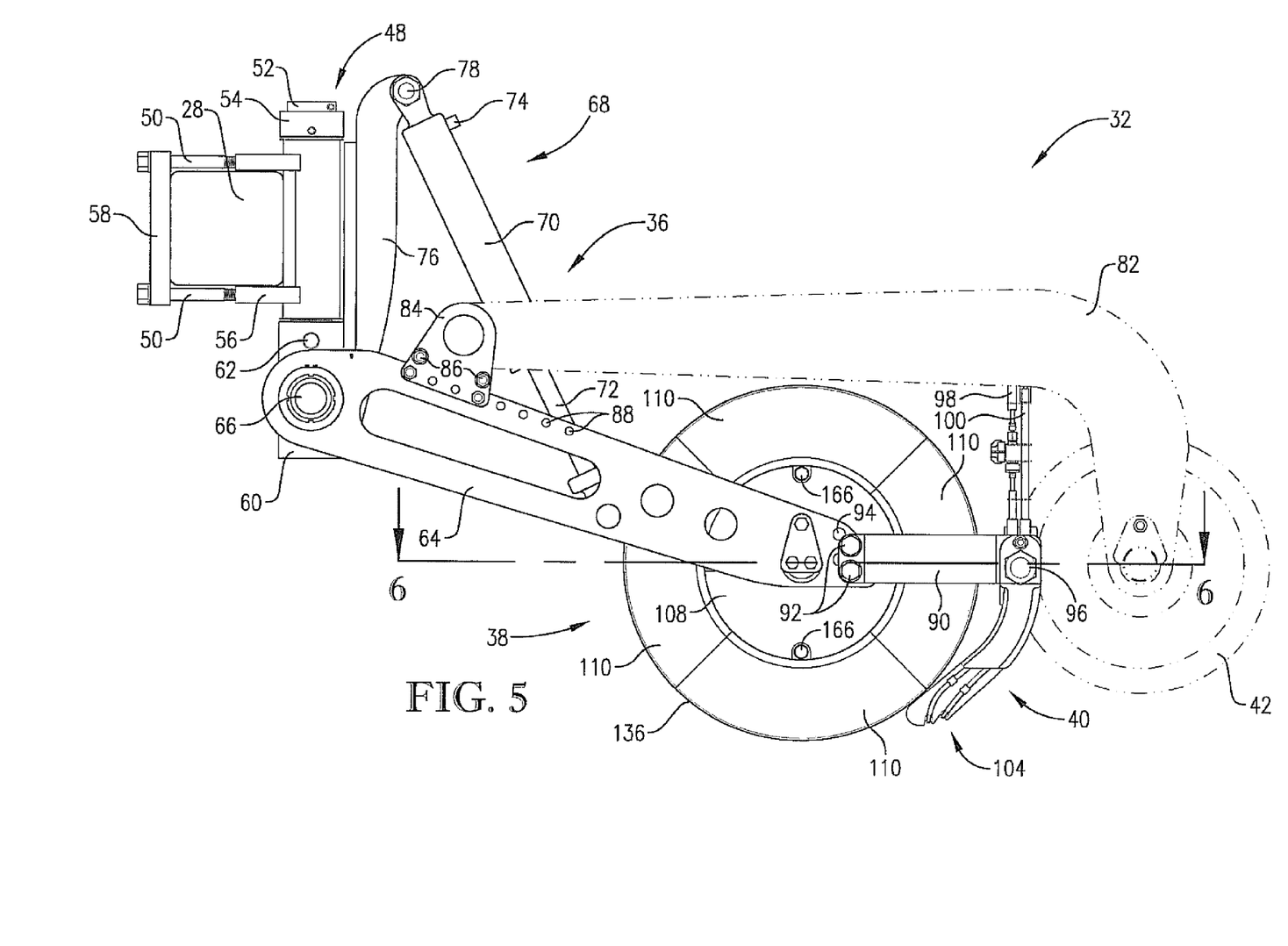
FIG. 5 is a an enlarged, side elevational view of the soil opener shown in FIG. 4, presented from the opposite vantage point, with the optional closing wheel shown in phantom lines, particularly illustrating the rotatable sectored disc assembly coupled to the draw bar assembly and the adjacently disposed injector foot.

With continued reference to FIG. 1, the exemplary soil opener assembly 32 depicted broadly includes a drawbar assembly 36, a sectored disc assembly 38, an injector boot assembly 40, and a closing wheel 42. The drawbar assembly 36 is bracketed to the toolbar 28 to thereby pull the other components of the soil opener assembly 32 behind the toolbar 28 while yieldably biasing the components downwardly into engagement with the ground 18 as the implement 10 moves through a field. With particular reference to FIGS. 2 and 5, a swiveling assembly 48 is attached to the toolbar 28 with a plurality of bolts 50. The swiveling assembly includes an inner member 52 and a coaxial outer member 54 that are configured for relative rotation therebetween. A mounting bracket 56 extends outwardly from the outer member 54. The bolts 50 pass through a plate 58, around the toolbar 28, and are secured to the mounting bracket 56 to thereby clamp the swiveling assembly 48 to the toolbar 28.

A drawbar bracket 60 connects the drawbar assembly 36 to the inner member 52 so that the drawbar assembly 36 can swivel relative to the toolbar 28. A locking pin 62 selectively locks the inner member 52 and the outer member 54 together to prevent relative rotation therebetween, thereby permitting an operator to "lock out" the swiveling movement of the drawbar assembly 36. Such locking out of the swiveling assembly 48 is often used, for example, to prevent drift of the soil opener assemblies 32 as the implement 10 is towed along steep inclines, as will be readily appreciated by one of ordinary skill in the art upon review of this disclosure.

Figure 4:
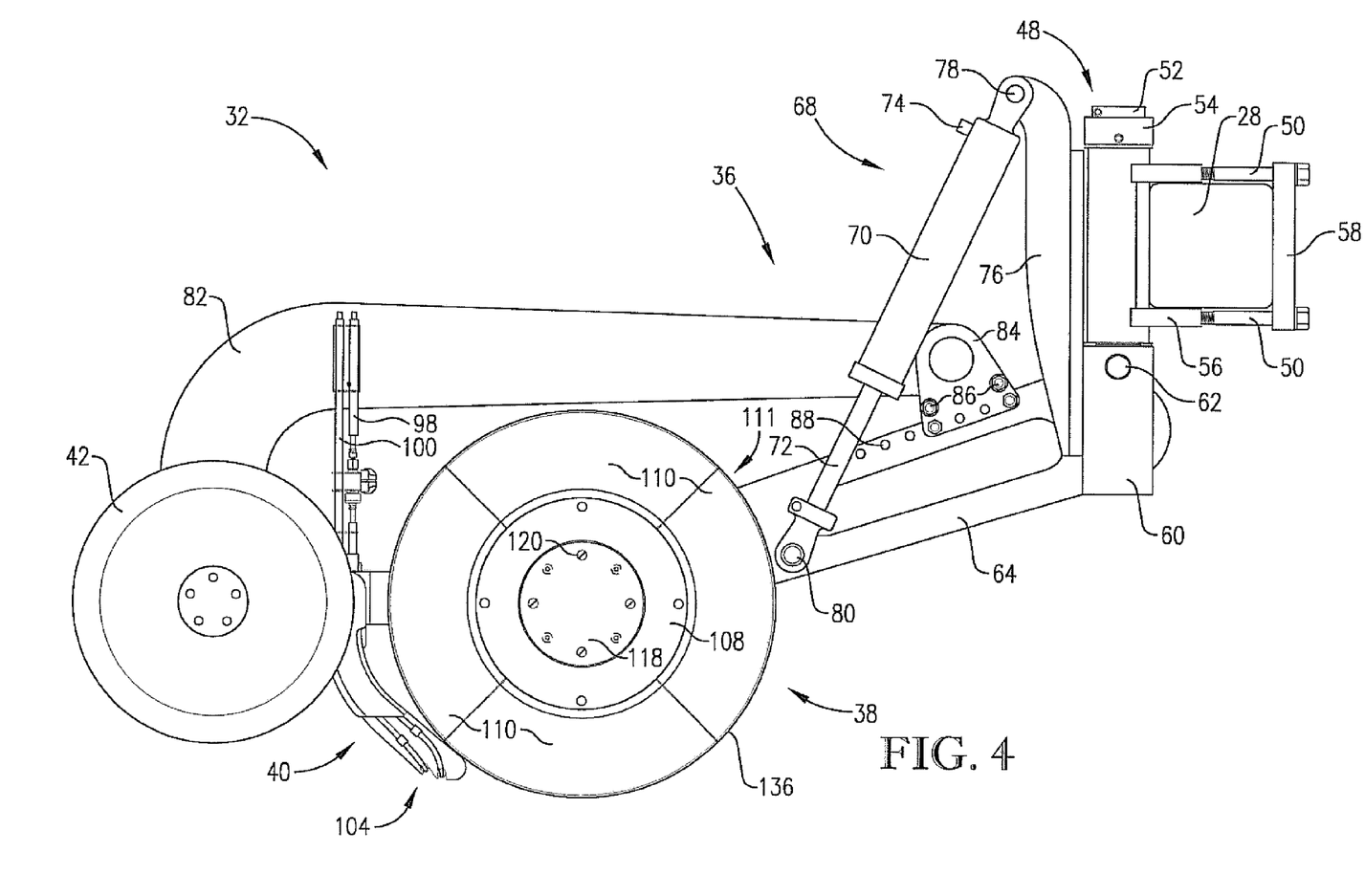
FIG. 4 is an enlarged, side elevational view of the soil opener shown in FIG. 2, presented from the opposite vantage point of that in FIG. 1, with the optional closing wheel shown in solid lines, particularly illustrating the rotatable sectored disc assembly coupled to a draw bar assembly and an adjacently disposed injector foot.

Turning now to FIGS. 4 and 5, the drawbar assembly 36 includes a disc opener arm 64 pivotally coupled to the drawbar bracket 60 with a pin 66. The pivotal movement of the drawbar assembly 36 allows the components thereof to be vertically adjusted relative to the ground 18. The vertical position of the drawbar assembly 36 is controlled by an adjustable-length strut 68. The strut 68 includes an outer cylinder 70 and a telescopingly interfitted inner rod 72, wherein the inner rod 72 is coaxial with and configured for relative sliding within the outer cylinder 70. A strut pin 74 passes through the outer cylinder 70 and into at least a portion of the inner rod 72 in a manner known in the art to lock the strut 68 at a particular length.

A strut support 76 is fixed to and extends vertically upwardly from the drawbar bracket 60. The ends of the adjustable-length strut 68 extends between a fixed position on the strut support 76 and a fixed position on the disc opener arm 64. In the illustrated embodiment, an end of the outer cylinder 70 is coupled to the top of the strut support 76 with a bolt-and-nut assembly 78 in a manner known in the art. Similarly, an end of the inner rod 72 is coupled to the disc opener arm 64 with a bolt-and-nut assembly 80 in a manner known in the art. It is noted that the depicted orientation of the strut 68 could be reversed, or an alternative device for adjusting the vertical height of the drawbar assembly 36 relative to the ground 18 could be used, without departing from the teachings of the present invention.

The sectored disc assembly 38 is rotatably coupled with and vertically fixed to the disc opener arm 64, as is discussed in greater detail below, for relative rotation therewith. Thus, it is noted that as the drawbar assembly 36, including the disc opener arm 64, is vertically adjusted relative to the ground 18 as described above, the sectored disc assembly 38 is correspondingly vertically adjusted relative to the ground 18. It is further noted that the principles of the present invention are not limited to the production of any particular crop and can readily be adapted to virtually all crops generated by placement of seed and/or fertilizer in the ground, as will be understood by one of ordinary skill in the art.

A closing wheel arm 82 is adjustably mounted to the disc opener arm 64, wherein the closing wheel arm 82 rotatably supports the closing wheel 42 at the end thereof. The closing wheel arm 82 is fixed to a closing wheel arm mounting bracket 84 that attaches to the disc opener arm 64 with a pair of bolt-and-nut assemblies 86. The bolt-and-nut assemblies 86 attach the mounting bracket 84 to the disc opener arm 64 by extending through a selected pair of a plurality of holes 88 in the disc opener arm 64. Extending the bolt-and-nut assemblies 86 through distinct pairs of holes 88 allows the closing wheel arm 82 to be adjustably mounted to the disc opener arm 64. By extension, this relative adjustability affects the relative position of the components mounted to the end of each of these arms, namely the sectored disc assembly 38 and the closing wheel 42, respectively. As shown in the difference between FIGS. 4 and 5, it is noted that the closing wheel 42, and its associated closing wheel arm 82, are depicted in FIG. 4 by way of example only and that the principals of the present invention do not depend on the selective inclusion of these elements, as will be readily appreciated by one of ordinary skill in the art upon review of this disclosure.

With continued reference to FIG. 5, an injector boot support element 90 is fixed to the end of the disc opener arm 64 with a pair of bolt-and-nut assemblies 92. The bolt-and-nut assemblies 92 attach the boot support element 90 to the disc opener arm 64 by extending through a selected pair of a plurality of holes 94 in the disc opener arm 64. Extending the bolt-and-nut assemblies 92 through distinct pairs of holes 94 allows the boot support element 90 to be adjustably mounted to the disc opener arm 64. The injector boot assembly 40 is fixed to the distal end of the boot support element 90 relative to the disc opener arm 64 by a bolt-and-nut assembly 96. Thus, adjustment of the boot support element 90 relative to the disc opener arm 64 as described above changes the disposition of the injector boot assembly 40 relative to the sectored disc assembly 38.

Figure 6:
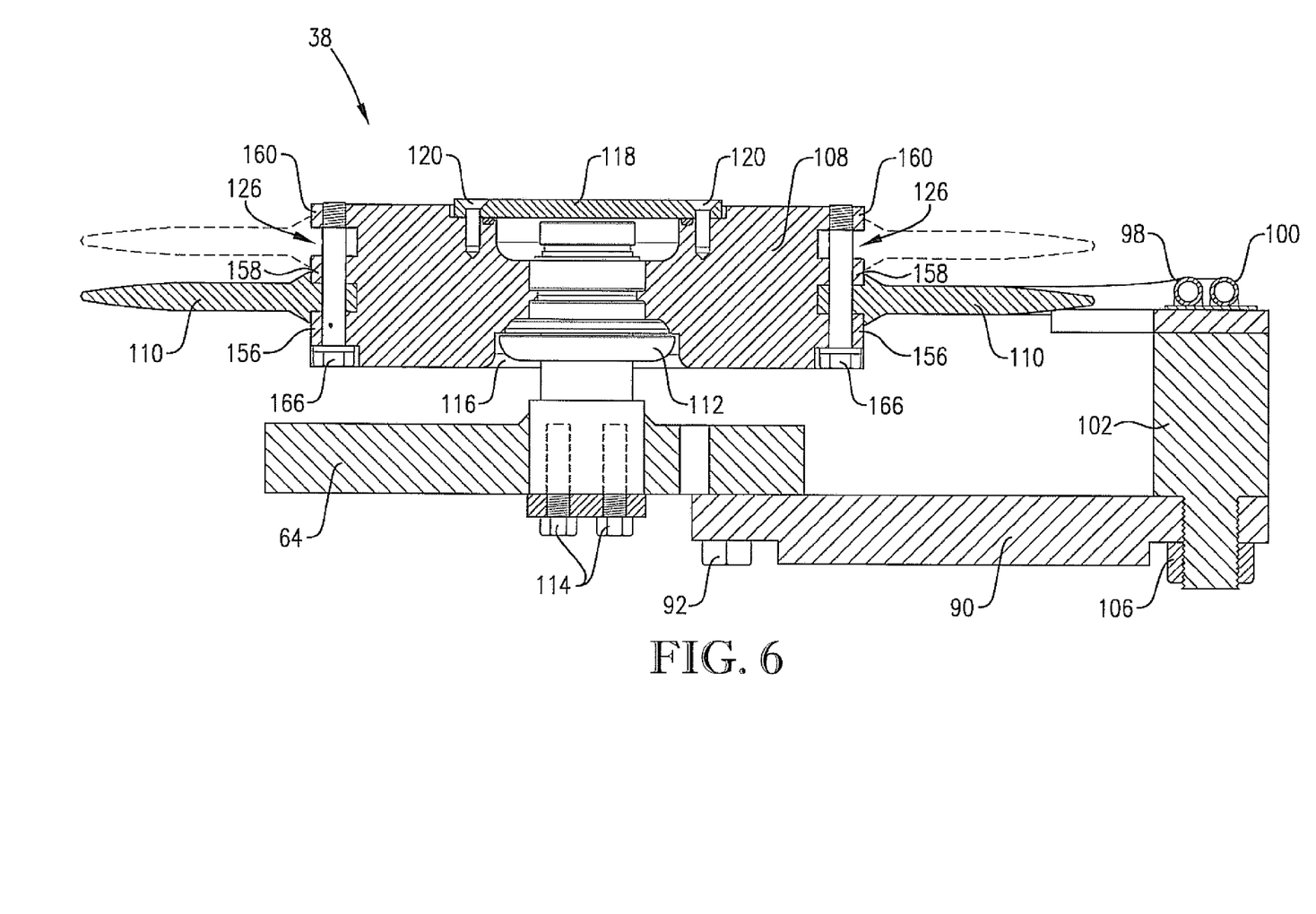
FIG. 6 is an enlarged, top-down sectional view of the rotatable sectored disc assembly and associated portion of the draw bar assembly, the view taken along the line 6-6 of FIG. 5, particularly illustrating in detail a plurality of disc sectors disposed about a rotatable hub with a tongue-and-groove connection and secured thereto with connecting bolts.

The injector boot assembly 40 broadly includes a pair of conduits 98 and 100 for carrying and controllably inserting seed, fertilizer, or both, into the ground in a manner generally known in the art and not described in detail here. Additionally, as shown in FIG. 6, a threaded extension 102 controls the lateral disposition of a distribution end 104 of the injector boot assembly 40 relative to the sectored disc assembly 38. The threaded extension 102 is coupled to the boot support element 90 and secured thereto with a nut 106. In the depicted embodiment, the distribution end 104 of the injector boot assembly 40 is adjacent an end of the sectored disc assembly 38, although this placement could be changed without departing from the teachings of the present invention.

As discussed briefly above, the sectored disc assembly 38 is rotatably coupled to the disc opener arm 64 for relative rotation therewith. The sectored disc assembly 38 broadly includes a rotatable hub 108 and a plurality of disc sectors 110 disposed around the hub 108 to cooperatively form a substantially continuous disc 111. In the illustrated embodiment, the hub 108 has considerable mass, weighing slightly more than one hundred pounds, substantially contributing to the total weight of each soil opener assembly 32 of approximately five hundred pounds.

The disc sectors 110 cooperate with the hub 108 to present a tongue-and-groove connection therebetween along the interface between the disc sectors 110 and the hub 108. As will be readily appreciated by one of ordinary skill in the art, as the agricultural implement 10 moves across a field, the soil opener assemblies 32 are often disposed at a slight angular offset relative to the direction of travel of the implement 10. It is particularly noted that while FIG. 3 depicts the soil opener assemblies 32 generally aligned with the direction of travel, the soil opener assemblies 32 may move about the swiveling assembly 48 during operation and often do not precisely follow the direction of travel. It is additionally noted that sometimes the soil opener assemblies 32 are intentionally offset from the direction of travel to facilitate the opening of the soil. This angular offset can lead to the introduction of considerable lateral forces to the components of the soil opener assemblies 32, including the substantially continuous disc 111. The tongue-and-groove connection between the disc sectors 110 and the hub 108 of the unique sectored disc assembly 38 described herein directs these lateral forces inward to the central hub 108 such that axial movement of the disc sectors 110 is restricted.

As shown particularly in FIG. 6, a spindle 112 is fixed to the disc opener arm 64 with a pair of bolts 114, wherein the spindle 112 extends generally transverse to the direction of travel of the implement 10 across a field. The hub 108 includes a generally central hole 116 therethrough about which the hub 108 is disposed about the spindle 112 for relative rotation therewith in a manner generally known in the art. A cap 118 is attached to the hub 108 with a plurality of screws 120 to cover the hole 116 when the hub 108 is disposed on the spindle 112. The cap 118 prevents dirt or other debris from entering the hole 116 in the hub 108, as will be appreciated by one of ordinary skill in the art.

With continued reference to FIG. 6 and turning also to FIGS. 7 and 8, the component parts of the sectored disc assembly 38 will be discussed in greater detail. The hub 108 is generally circular and presents a continuous outer periphery 122, although it is noted that it is within the ambit of the present invention to incorporate alternative hubs of other general shapes (e.g., polygonal), so long as such a hub is rotatable about the spindle 112 or the like. The hub 108 also includes a radially inwardly extending circumferential groove 124 that extends continuously about the outer periphery of the hub 108.

In the illustrated embodiment, the hub 108 includes an additional groove 126, substantially identical to the groove 124, but disposed axially away from the groove 124. The second groove 126 can provide an alternative location for the disposition of the plurality of disc sectors 110. The second groove 126 can also provide a location for the disposition of a depth band for controlling the depth to which the soil is opened, as will be appreciated by one of ordinary skill in the art. Although it is not necessary to provide multiple grooves in the hub 108, it is further noted that more than the two depicted grooves could be provided in the hub 108, so long as there is at least one groove to cooperate with the plurality of disc sectors 110 to form the substantially continuous disc 111 of the sectored disc assembly 38. It is further noted that an alternative hub (not shown) could present a noncontinuous groove without departing from the teachings of the present invention, as will be readily appreciated by one of ordinary skill in the art upon review of this disclosure.

Figure 7:
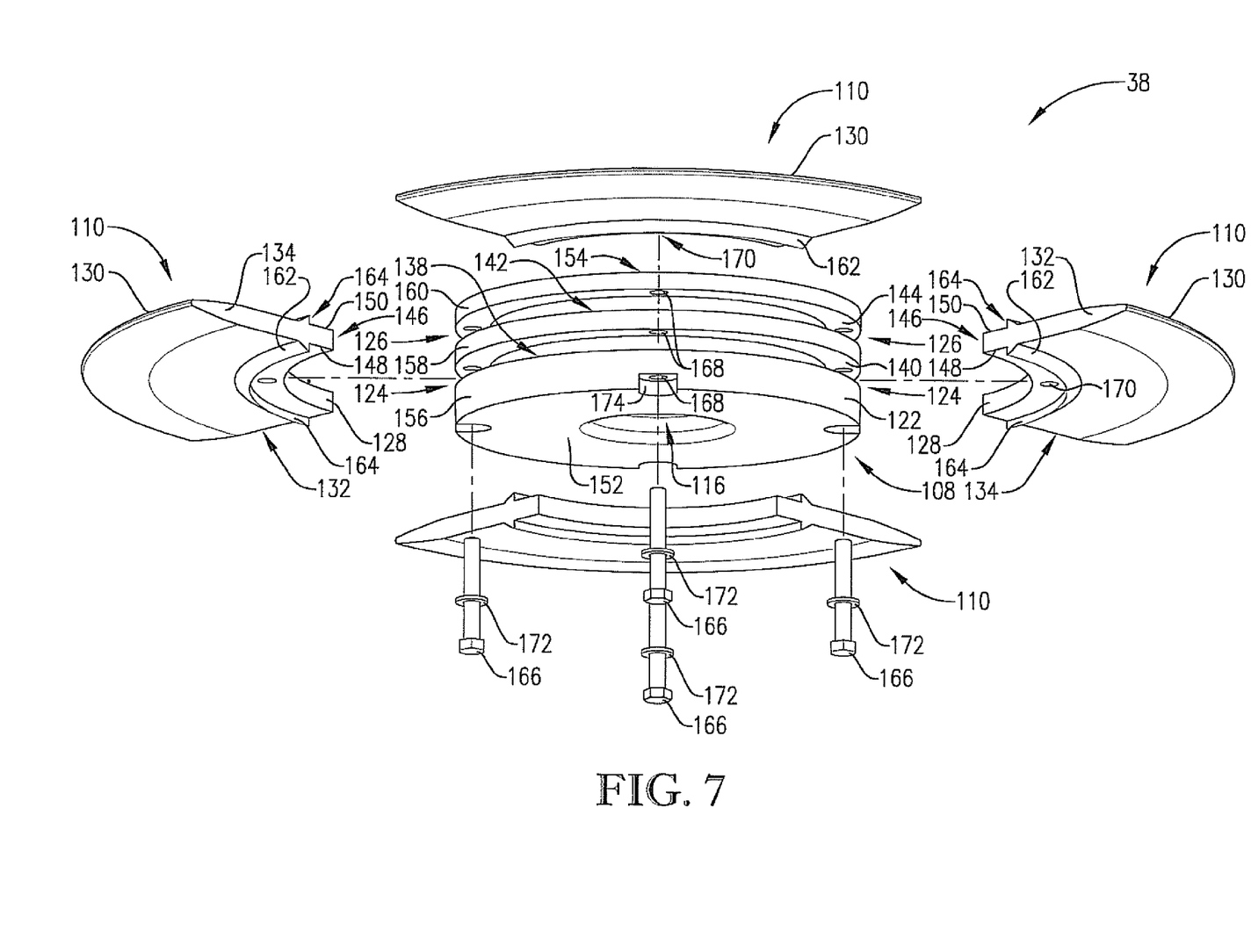
FIG. 7 is an exploded perspective view of the sectored disc assembly shown in FIG. 6, particularly illustrating the separate components thereof, including the rotatable hub, the plurality of disc sectors, and the connecting bolts.

The plurality of disc sectors 110, depicted individually in detail in FIG. 7, each includes a radially inner margin 128 and a radially outer margin 130. Each disc sector 110 further includes radially extending side surfaces 132 and 134 that extend generally flatly between the inner margin 128 and the outer margin 130. The disc sectors 110 are each partially received within the groove 124 to restrict axial movement of each disc sector 110 relative to the hub 108. The disc sectors 110 and the hub 108 interfit in a tongue-and-groove connection along the outer periphery 122 of the hub 108 to form the substantially continuous disc 111 about the hub 108, as will be described in more detail below.

The radially outer margins 130 of the plurality of disc sectors 110 are generally arcuate and cooperate to form a substantially continuous disc edge 136. The disc edge 136 is generally circular and serves as the end of a blade to open the soil as the implement 10 moves across a field, as will be readily appreciated by one of ordinary skill in the art. It is noted that it is clearly within the ambit of the present invention to provide alternative disc sectors that cooperate to form a disc edge that is noncontinuous and presents, for example, an edge that is fluted, serrated, or spoked.

The axial width of the disc sectors 110 taper inwardly from the radially inner margins 128 to the radial outer margins 130 such that the tongue-and-groove connection is sufficiently strong to take the lateral forces and the disc edge 136 is sufficiently narrow to penetrate into the soil to form the furrow. In the illustrated embodiment, the radially inner margins 128 of the disc sectors 110 are also generally arcuate and correspond with the shape of the groove 124 in the hub 108 to interfit therein. It is noted, however, that with an alternately shaped hub, such as described above, it is clearly within the ambit of the present invention for the corresponding radially inner margins of cooperating alternative disc sectors to have a shape that is nonarcuate to flushly engage a corresponding surface on the outer periphery of such an alternative hub.

Figure 8:
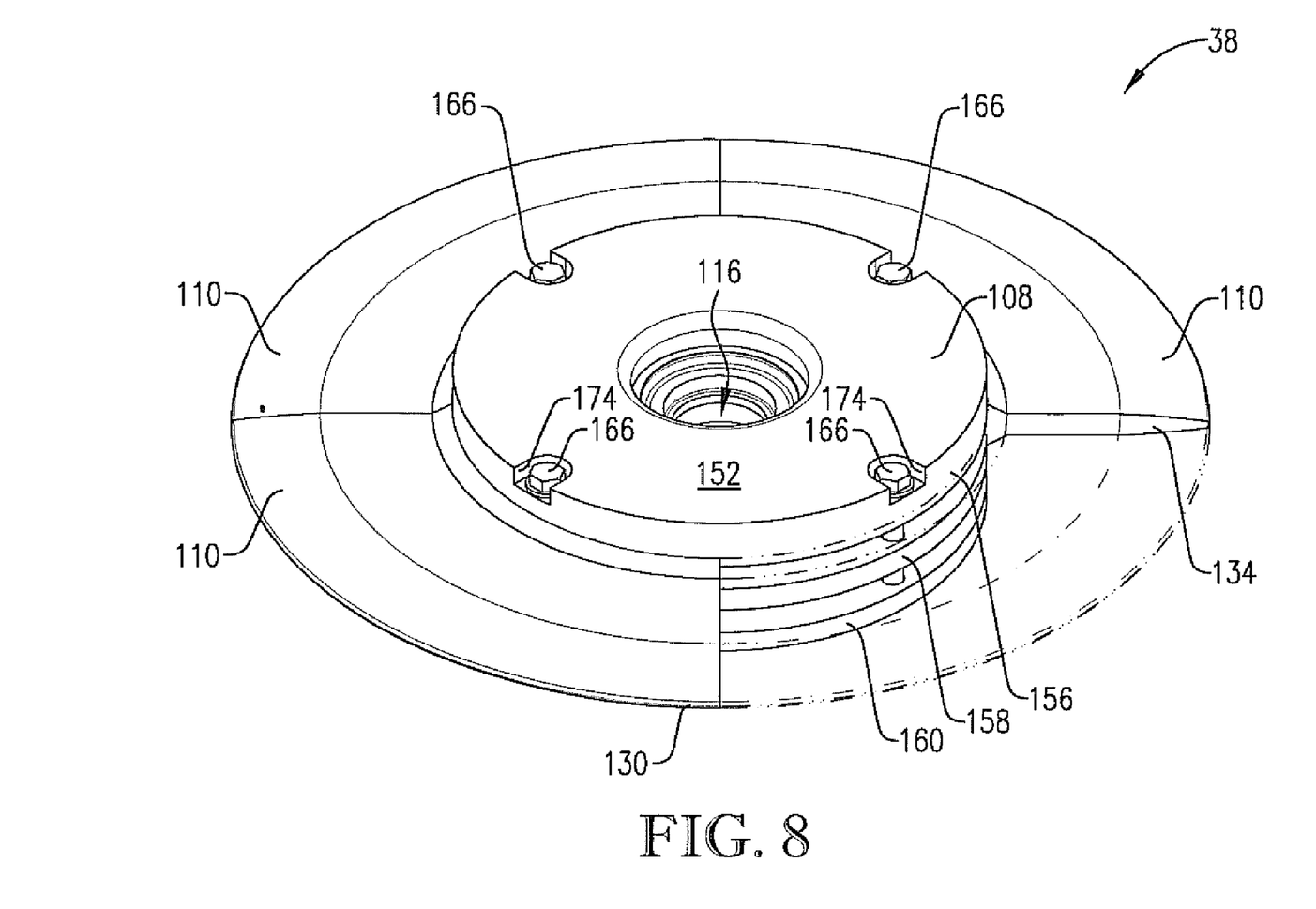
FIG. 8 is a perspective assembly view of the sectored disc assembly shown in FIG. 7, particularly illustrating the plurality of disc sectors cooperatively forming a substantially continuous disc disposed about the rotatable hub, with one disc sector shown in phantom lines to depict removal of a single disc sector from the sectored disc assembly and the associated disposition of the connecting bolt through a portion of the rotatable hub.

With continued reference to the embodiment depicted in FIGS. 7 and 8, it is noted that the illustrated groove 124 of the hub 108 presents a generally U-shaped channel with opposed faces 138 and 140. Similarly, the groove 126 of the hub 108 presents a generally U-shaped channel with opposed faces 142 and 144. Also in the illustrated embodiment, the each disc sector 110 includes a tongue section 146 that presents opposed engagement surfaces 148 and 150. In the tongue-and-groove connection between the disc sectors 110 and the hub 108, the opposed faces 138 and 140 of the groove flushly contact the engagement surfaces 148 and 150 of the tongue section 146.

It is clearly within the ambit of the present invention to provide an alternative groove that is not U-shaped, so long as the tongue and groove sections correspond for a snug connection therebetween. It is additionally specifically noted that in an alternative embodiment (not shown) that the components of the tongue-and-groove connection could be switched, such that a central hub presents a tongue section and a plurality of disc sectors present a corresponding groove. In such an alternative embodiment, similar flush contact would result between opposed faces and engagement surfaces such that a substantially continuous disc would be formed about the hub, wherein axial movement of the disc sectors relative to the hub was restricted.

Regarding additional specifics of the depicted central hub 108, it is noted that the hub 108 includes a pair of axially opposed, generally planar side portions 152 and 154. The grooves 124 and 126 in the central hub 108 define radially extending flange sections 156, 158, and 160 along the outer periphery 122 of the hub 108, wherein the grooves 124 and 126 extend between the flange sections 156, 158, and 160. The flange section 156 extends axially between the hub side portion 152 and the opposed face 138 of the groove 124. Similarly, the flange section 158 extends axially between the opposed face 140 of the groove 124 and the opposed face 142 of the second groove 126. Also, the flange section 160 extends axially between the opposed face 144 of the second groove 126 and the hub side portion 154.

Regarding additional specifics of the depicted individual disc sectors 110, it is noted that each disc sector includes a pair of axially extending flared shoulder sections 162 that each extend axially outward beyond the dimension of the tongue section 146. Each of the shoulder sections 162 present a radially inner shoulder surface 164. In the sectored disc assembly 38, the shoulder surfaces 164 flushly contact the outer periphery 122 of the hub 110.

As described briefly above, the radially extending side surfaces 132 and 134 of each disc sector 110 extend generally flatly between the inner margin 128 and the outer margin 130. A surface 132 of an individual disc sector 110 bears against the corresponding surface 134 of an adjacent disc sector 110 to restrict circumferential movement of any individual disc sector 110 of the substantially continuous disc 111. In addition, as shown in FIG. 8, the generally flat shape of the side surfaces 132 and 134 allow a single disc sector 110 to be removed from or inserted into the hub 108 without disturbance to the other disc sectors 110.

With continued reference to the embodiment depicted in FIGS. 7 and 8, a plurality of bolt connectors 166 are included to secure each of the disc sectors 110 to the central hub 108. The hub 108 includes a plurality of holes 168 that extend axially therethrough, spanning all of the flange sections 156, 158, and 160. Each of the disc sectors 110 similarly includes a hole 170 that is axially aligned with the corresponding hole 168 in the hub 108 when the disc sector 110 is disposed therein. A bolt 166 extends through a washer 172, through one of the holes 168 in the flange section 156, through one of the holes 170 in the disc section 110, and through the remainder of the hole 168 in the hub 108. Each of the disc sectors 110 are secured to the hub 108 in like manner, as will be readily appreciated by one of ordinary skill in the art.

The front side 152 of the hub 108 also includes a recess 174 around each of the holes 168. The recess 174 is axially larger than the diameter of the hole 168 and extends radially inwardly through the flange 156 toward the groove 124. Each of these recesses 174 allow the head of the bolt 166 to countersink below the surface of the front side 152 of the hub 108 as shown in FIG. 8. The countersinking of the bolts 166 into the hub 108 provides the sectored disc assembly 38 with a clean design without exposed hub nuts or bolts to disturb material as the blade cuts into the soil.

Finally, it is noted that in the illustrated embodiment, the sectored disc assembly 38 includes four substantially identical disc sectors 110 that each define a quadrant of the substantially continuous disc 111. It is clearly within the ambit of the present invention to provide alternative disc sectors that are not substantially identical or require more or fewer than the depicted four sectors to make up a substantially continuous disc. Such variations will be readily appreciated by one of ordinary skill in the art upon review of this disclosure.

The disc sectors 110 are preferably, although not necessarily, formed by casting the sectors from a metal alloy. Examples of preferred alloys for the material of the disc sectors 110 include steel 8630, ASTM 897 heat treated, and YC chrome, as will be understood by one or ordinary skill in the art. The efficient and simple ability to change out individual disc sectors 110 allows an operator to replace damaged or worn disc sectors 110 without the cost of replacing an entire unitary disc. In addition, an operator can easily change the material of the disc sectors 110, and thus the entire disc 111, as desired to match the material of the disc to the particular characteristics of the soil to be worked by the implement 10.

The method of replacing a given disc sector 110 of the sectored disc assembly 38 should be apparent from the foregoing and, therefore, will be described here only briefly. With particular reference to FIGS. 7 and 8, the connecting bolt 166 is accessed through the recess 174 and removed from the sectored disc assembly 38 in the axial direction. After the removal of this single connecting bolt 166, the disc sector 110 to be removed is simply moved radially outwardly and away from the hub 108. As the disc sector 110 is moved away from the hub 108, the opposed faces 138 and 140 of the groove 124 and the corresponding engagement surfaces 148 and 150 of the tongue section 146 slide radially past each other so that the disc sector 110 moves smoothly out of the hub 108.

In substantially the reverse of the above-described removal procedure, a replacement disc sector 110 is placed into contact with the hub 108 so that the replacement disc sector 110 and the hub 108 cooperatively form a tongue-and-groove connection extending along the periphery of the hub 108. In making such tongue-and-groove connection, the engagement surfaces 148 and 150 of the tongue section 146 of the replacement disc sector 110 contact and slide into a snug connection with the corresponding opposed faces 138 and 140 of the groove 124. As the replacement disc sector 110 is inserted into the groove 124 of the hub 108, the generally flat radially extending side surfaces 132 and 134 of the replacement disc sector 110 slidingly engage the corresponding side surfaces 132 and 134 of the adjacent disc sectors 110 already secured to the hub 108. As is shown particularly in FIG. 8, this sliding engagement of the side surfaces 132 and 134 allows removal and insertion of a single disc sector 110 relative to the hub 108 without removing other disc sectors 110.

Finally, the connecting bolt 166 is inserted into the hole 168 in the hub 108 and extended axially through the hole 170 in the replacement disc sector 110 to secure the disc sector 110 to the hub 108. As will be readily appreciated by one of ordinary skill in the art, the ability to replace a disc sector 110 with manipulation of only a single connecting bolt 166 and without disturbance of the other disc sectors 110 in the sectored disc assembly 38 allows for replacement in an efficient and simple manner as described above.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and access the reasonably fair scope of the present invention as pertains to any apparatus not materially departing from but outside the literal scope of the invention set forth in the following claims.

What is claimed is:

1. A sectored disc assembly for use in a soil opener of an agricultural implement, wherein the disc assembly serves as a blade to open the soil prior to injection of a fertilizer or seed into the ground, said assembly comprising:

a rotatable hub presenting a central rotational axis and a radial outer periphery; and a plurality of disc sectors, each disc sector disposed around the periphery of the hub and extending radially outwardly therefrom, said disc sectors cooperatively forming a substantially continuous disc disposed radially around and coaxial with the hub, said disc sectors cooperating with the hub to define a substantially continuous interface therebetween around the periphery of the hub, each disc sector cooperating with the hub to present a substantially continuous tongue-and-groove connection along the interface, wherein one of the disc sector and hub includes a radially extending internal groove and the other of the disc sector and hub includes a radially extending tongue, with the tongue being received in the groove to restrict axial movement of the disc sector relative to the hub, each disc sector being generally symmetrical with respect to a central bisecting plane extending orthogonal to the rotational axis, said disc sectors including an axially extending flared shoulder section that presents an axial dimension that is greater than the axial dimension of the tongue, said shoulder section presenting a radially inner end defining a pair of axially extending shoulder surfaces, said shoulder surfaces corresponding to and flushly abutting the outer periphery of the hub.

2. The sectored disc assembly as claimed in claim 1,
said groove being defined between a pair of radially extending flange sections,
said flange sections presenting a pair of radially extending and axially opposed side faces, wherein each flange section extends axially outwardly from the side face.

3. The sectored disc assembly as claimed in claim 2,
said disc sectors presenting a radially inner margin and a radially outwardly spaced generally arcuate outer margin.

4. The sectored disc assembly as claimed in claim 3,
said disc sectors presenting a pair of radially extending and circumferentially opposed engagement surfaces, wherein the engagement surfaces extend between the inner margin and the outer margin,
each engagement surface being generally radially straight and flushly abutting a corresponding engagement surface of the adjacent disc sector.

5. The sectored disc assembly as claimed in claim 4; and
a plurality of connectors, each connector extending parallel to the rotational axis, wherein the connectors secure each of the disc sectors to the hub.

6. The sectored disc assembly as claimed in claim 5,
each connector extending axially through at least one flange section and at least partially through the tongue.

7. The sectored disc assembly as claimed in claim 6,
each disc sector having exactly one connector extending at least partially therethrough.

8. The sectored disc assembly as claimed in claim 7,
said connectors comprising bolts.

9. The sectored disc assembly as claimed in claim 8,
each disc sector presenting an axial thickness that tapers in a radially outer direction adjacent the outer margin.

10. The sectored disc assembly as claimed in claim 9,
each disc sector being generally symmetrical to each other disc sector.

11. The sectored disc assembly as claimed in claim 10,
said disc sectors comprising four symmetrical disc sectors.

12. The sectored disc assembly as claimed in claim 11,
said disc sectors being formed by casting.

13. The sectored disc assembly as claimed in claim 12,
said hub being generally circular,
said radially inner margin having a generally arcuate shape.

14. The sectored disc assembly as claimed in claim 13,
said hub presenting the radially extending internal groove,
said groove being generally continuous about the periphery of the hub.

15. The sectored disc assembly as claimed in claim 14,
said pair of radially extending and axially opposed side faces being generally parallel,
said groove further presenting a radially interior base face to define a generally U-shaped groove about the periphery of the hub.

16. A disc sector removably and individually connectable to a rotatable hub of a sectored disc assembly serving as a blade of a soil opener to open the soil prior to injection of a fertilizer or seed into the ground, wherein the hub presents a central rotational axis and a pair of circumferentially extending opposed faces along the outer periphery thereof, and wherein the disc sector cooperates with other disc sectors to form a substantially continuous disc disposed radially around the hub, said disc sector comprising:

a sector body presenting a radially inner margin, a radially outwardly spaced generally arcuate outer margin, and generally radially extending side margins each defined between the inner and outer margins, said body including a pair of opposed engagement surfaces configured for flush contact with the opposed faces of the hub so that axial movement of the disc sector relative to the hub is thereby restricted, said body presenting an axial thickness that tapers in a radially outer direction adjacent the outer margin, said side margins cooperatively forming an acute angle therebetween and being configured for continuous abutment with adjacent ones of the other disc sectors, said body being generally symmetrical with respect to a central bisecting plane extending orthogonal to the hub axis, said body including an axially extending flared shoulder section that presents an axial dimension that is greater than the axial dimension defined between the pair of opposed engagement surfaces, said shoulder section presenting a radially inner end defining a pair of axially extending shoulder surfaces, said shoulder surfaces configured for flush contact with the outer periphery of the hub.

17. The disc sector as claimed in claim 16,
said opposed engagement surfaces being generally radially straight.

18. The disc sector as claimed in claim 17,
said sector body including a radially inwardly extending tongue defined between the pair of opposed engagement surfaces,
said tongue being configured for snug receipt between the opposed faces of the hub to thereby restrict axial movement of the sector body relative to the hub.

19. The disc sector as claimed in claim 18,
said radially inner margin being generally arcuate.

20. The disc sector as claimed in claim 19,
said sector body being formed by casting.

21. A method of replacing a disc sector of a sectored disc assembly serving as a blade of a soil opener to open the soil prior to injection of a fertilizer or seed into the ground, wherein the sectored disc assembly includes a hub rotatable about an axis and a generally axially extending connector for securing the disc sector to the hub, and wherein the disc sector includes an axially extending flared shoulder section having an axial dimension that is greater than the axial dimension of the hub so as to present a pair of axially extending shoulder surfaces, said disc sector replacement method comprising the steps:

(a) removing the generally axially extending connector that secures the disc sector to the rotatable hub of the sectored disc assembly;

(b) moving the disc sector radially outwardly and away from the hub;

(c) placing a replacement disc sector into contact with the hub so that the replacement disc sector and hub cooperatively form a substantially continuous tongue-and-groove connection extending along the periphery of the hub, and so that the shoulder surfaces of the disc sector flushly contact the outer periphery of the hub; and (d) inserting the generally axially extending connector to secure the replacement disc sector to the hub.

22. The disc sector replacement method of claim 21,
step (b) including the step of leaving other disc sectors connected to the hub.

23. The disc sector replacement method of claim 22,
step (c) including the step of placing the replacement disc sector into contact with the radially extending engagement surfaces of the adjacent disc sectors.

24. The disc sector replacement method of claim 23,
step (c) including the step of inserting the tongue on the replacement sector into the groove on the hub.

25. The disc sector replacement method of claim 24,
step (a) including the step of removing a single bolt in the axial direction that secures the disc sector to the rotatable hub of the sectored disc assembly.

\* \* \* \* \*